United States Patent [19]

Gruner et al.

[11] Patent Number: 4,675,810
[45] Date of Patent: Jun. 23, 1987

[54] DIGITAL DATA PROCESSING SYSTEM HAVING A UNIQUELY ORGANIZED MEMORY SYSTEM USING OBJECT-BASED ADDRESSING AND IN WHICH OPERAND DATA IS IDENTIFIED BY NAMES ACCESSED BY NAME TABLES

[75] Inventors: Ronald H. Gruner, Cary, N.C.; Gerald F. Clancy, Saratoga, Calif.; Craig J. Mundie, Cary; Stephen I. Schleimer, Chapel Hill, both of N.C.; Steven J. Wallach, Saratoga, Calif.; Richard G. Bratt, Wayland; Edward S. Gavrin, Lincoln, both of Mass.; Walter A. Wallach, Jr., Raleigh, N.C.; John K. Ahlstrom, Mountain View, Calif.; Michael S. Richmond, Pittsboro, N.C.; David H. Bernstein, Ashland, Mass.; John F. Pilat, Raleigh; David A. Farber, Durham, both of N.C.; Richard A. Belgard, Saratoga, Calif.

[73] Assignee: Data General Corp., Westborough, Mass.

[21] Appl. No.: 266,536

[22] Filed: May 22, 1981

[51] Int. Cl.$^4$ ............................................. G06F 9/06
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,905,023 | 9/1975 | Perpiglia | 364/200 |
| 4,044,334 | 8/1977 | Bachman et al. | 364/200 |
| 4,123,795 | 10/1978 | Dean, Jr. et al. | 364/200 |
| 4,130,867 | 12/1978 | Bachman et al. | 364/200 |

Primary Examiner—Thomas M. Heckles
Assistant Examiner—Daniel K. Dorsey
Attorney, Agent, or Firm—Robert F. O'Connell

[57] ABSTRACT

A digital computer system having a memory system organized into procedure and data objects, each having a unique identifier code and an access control list, for storing items of information and a processor for processing data in response to instructions. The instructions contain operation codes and names representing data. Each name corresponds to a name table entry in a name table which contains information from which the processor determines the location and the format for the data. The name table entry specifies a base address of one of a set thereof which change value only when a call or a return instruction is executed. A name interpretation system fetches a name table entry, calculates the base address and a displacement using the name table entry and the current architectural base address and adds the base address to the displacement to form the address of the data represented by the name.

18 Claims, 8 Drawing Figures

FU 10120 MICROMACHINE PROGRAMS

SOURCE TEXT LISTING

```
923  0  :   @20@:
924  0  :   ENTRY BREL:
925  0  :       OFF_ALU_OUT = IPC OR PC.AON,
926  0  :       LOAD_AON( PF) WITH AON( PC.AON),
927  0  :       LOAD_OFF( PF) WITH OFFSET;
928  0  :
929  0  :       PARSE_K_LOAD_EPC, /* INSURE PAGE CROSSING DETECTED */
930  0  :       OFF_ALU_OUT = PARSER (SIGN_EXTEND) LEFT_SHIFTED(3) OR
931  0  :           ZEROVAL,
932  0  :       LOAD (ACCUMULATOR) WITH OFFSET;
933  0  :
934  0  :       OFF_ALU_OUT = ACC PLUS PF,
935  0  :       READ_PREFETCH_FOR_BRANCH USING OFF_ALU CON_LENGTH( 32),
936  0  :       SOURCE( OFF_ALU_DATA) TO JPD_BUS( CURR_PC),
937  0  :       GOTO _NEXT_S_OP;
938  0  :
```

MICROINSTRUCTIONS

```
923  0  :   @20@:
924  0  :   ENTRY BREL:
925  0  :       OFF_ALU_UUT = IPC OR COMMON ( @A@ , 7 ),
  M  0  :         ipd_ctrl 10 alu_op 5 src_frame 2 , r_source 7 , com_ext @A@
926  0  :       LOAD_AON ( CURRENT ( 5 ) ) WITH AON ( COMMON ( @A@ , 7 ) ),
  M  0  :         dest_frame 0 , r_dest 5 , r_w 1 a_in 2, src_frame
  M  0  :         2 , r_source 7 , com_ext @A@
927  0  :       LOAD_OFF ( CURRENT ( 5 ) ) WITH OFFSET
  M  0  :         dest_frame 0 , r_dest 5 , r_w 1 o_in 3
927  0  :   :
929  0  :       PARSE_K_LOAD_EP ,
  M  0  :         dev_cmd 121 , nb_ctrl 1 ,
930  0  :       OFF_ALU_OUT = PARSER ( SIGN_EXTEND ) LEFT_SHIFTED ( 3 ) OR
  M  0  :         alu_in 2 , nb_ctrl 1 , rand 1 sf 3 alu_op 5
931  0  :       COMMON ( @B@ , 0 ) ,
  M  0  :         src_frame 2 , r_source 0 , com_ext @B@ ,
932  0  :       LOAD ( ACCUMULATOR ) WITH OFFSET
  M  0  :         a_w 1 , o_in 3
932  0  :   :
934  0  :       OFF_ALU_OUT = ACC PLUS CURRENT ( 5 ) ,
  M  0  :         alu_in 2 alu_op 3 src_frame 0 , r_source 5 ,
935  0  :       READ_PREFETCH_F USING OFF_ALU CON_LENGTH ( 32 ) ,
  M  0  :         mem 7 , dev_cmd 124 db_ctrl 1 len_ctrl 6 ,
936  0  :       SOURCE ( OFF_ALU_DATA ) TO JPD_BUS ( CURR_PC ) ,
  M  0  :         ipd_ctrl 7 dev_cmd 124 ,
937  0  :       GOTO _NEXT_S_OP
  M  0  :         nac 4 , lit8 _NEXT_S_OP
937  0  :   :
```

FIG. 274

POINTER FORMATS

GENERAL POINTER FORMAT 30101

| OFFSET 30103 | FLAGS AND FORMAT | IN UID POINTERS: UID 30115 |
|---|---|---|
| BITS 0-31 | BITS 32-47 | BITS 48-127 |

FLAGS AND FORMAT 30105

| RESERVED 30107 | NR 30109 | RESERVED 30111 | FORMAT CODE 30113 |
|---|---|---|---|
| 32  33  34  35  36  37  38  39 | 40 | 41  42 | 43  44  45  46  47 |

FIG. 301

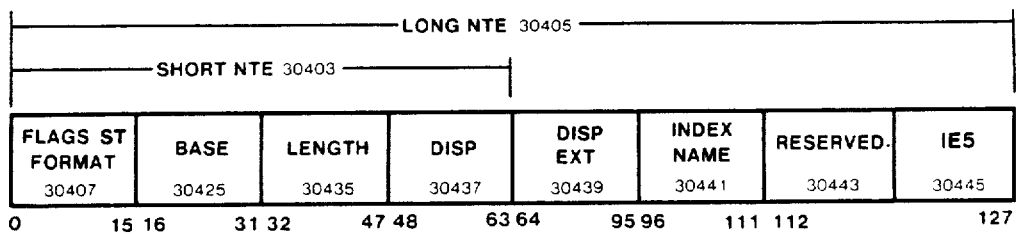
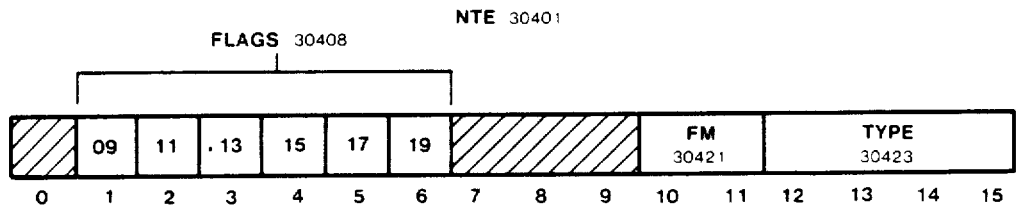
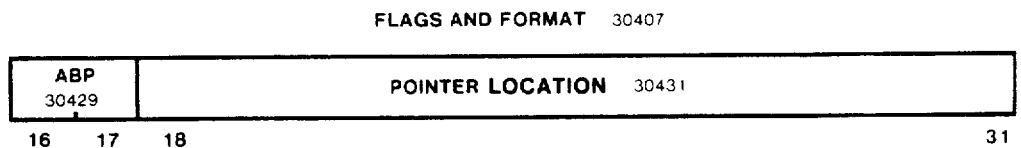
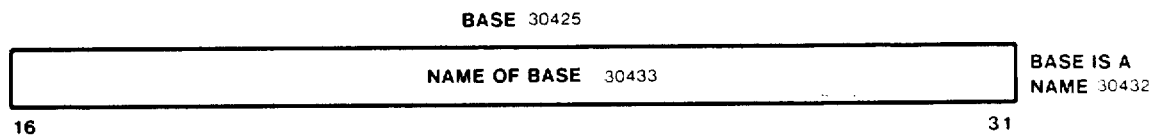
FIG. 304

NAME CACHE REGISTERS

TRANSLATING S-INTERPRETER UIDS TO DIALECT NUMBERS

DIGITAL DATA PROCESSING SYSTEM HAVING A UNIQUELY ORGANIZED MEMORY SYSTEM USING OBJECT-BASED ADDRESSING AND IN WHICH OPERAND DATA IS IDENTIFIED BY NAMES ACCESSED BY NAME TABLES

CROSS-REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system which includes a memory means organized into uniquely identified objects containing items of information which can be accessed via name tables which specify the location of an object which contains the item named.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently re-translated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structre and operation of prior art data processing systems have not been flexible, or adaptive, in structure and operation. That is, the internal structure structure and operation of prior systems have not allowed the systems to be easily modified or adapted to meet particular data processing requirement. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system, should not be apparent at the user interface.

The present invention provides data processing system improvements and features which solve the above-described problems and limitations.

SUMMARY OF THE INVENTION

The present invention relates generally to digital computer systems having a memory system and one or more processors connected thereto and, more specifically, to systems employing object-based addressing of data. The memory system is organized into objects containing data items, each object being uniquely identified by an object identifier. Locations of data items in the memory system are specified by means of the object identifier and an offset specifying the bit at which the data item begins in the object.

Access by a subject using the system to the data items in the object is controlled, an access control list associated with each object defining sets of subjects and a set of memory operations which a subject may perform on the data items. The data items include instructions which are executable by the processor, operands therein being represented by names. Each name correponds to a name table entry, data in the name table entry corresponding to a name specifying how the processor is to derive the logical address of the operand represented by the name.

The memory system responds to a memory operation specifier consisting of a memory command specifying a memory operation such as read data or write data, a logical address containing a representation of an object identifier, an offset, and a length in bits and to a value representing the subject for which the processor is currently executing a procedure. In response to each memory operation specifier, the memory system checks to determine whether or not the current subject can perform the operation in the object specified by the logical address.

The processor includes instruction decoding apparatus, logical address generating apparatus which generates logical addresses, and control apparatus for controlling the processor in response to signals from the other components and the memory system and providing memory commands to the memory system. The logical address generation apparatus generates a logical address for a data item represented by a name by performing a resolve operation on the name wherein the logical address generator derives the logical address as specified in the name table entry corresponding to the name. The logical address generation hardware also generates the logical address of the next instruction to be executed.

In executing an instruction the logical address generator generates the address of the next instruction, and the processor outputs a memory command containing that address to the memory system which in turn outputs the instruction to the processor. The instruction decoder decodes the operation code, and in response to the instruction decoder, the control apparatus causes the logical address generation apparatus to resolve the names in the instruction. The processor produces a memory operation specifier for data by outputting the logical address produced by the logical address generation apparatus together with a memory command produced by the control apparatus.

A name table entry specifies the location of the data represented by the name in terms of a displacement from a base address which is specified with reference to a set of architectural base addresses whose values change only when the digital computer system executes a call instruction beginning an execution of a procedure or a return instruction terminating an execution of a procedure.

Name resolution is performed by name interpretation apparatus operation under microcode control. The name interpretation apparatus locates the name table entry associated with the name and using the information in the name table entry and the current values of the architectural base addresses calculates the base address and the displacement and obtains the address of the item represented by the name by adding the displacement to the base address. The name interpretation apparatus may further perform a name evaluation operation in which such address is provided to the memory system and the data represented by the name fetched to the processor.

Name table entries in the present invention may themselves include names associated with other name table entries in the name table. For example, a name table entry may specify a base address by means of an included name representing a pointer. In this case, the name interpretation apparatus resolves the name corresponding to the name table entry by evaluating the included name to obtain the base address and then adding the displacement to the base address. The name table entry for the included name may itself contain included names, and thus, the resolution of a name may involve the resolution or evaluation of any number of names. The name interpretation apparatus deals with included names by evaluating or resolving them recursively.

The set of architectural base addresses in the present invention includes three addresses: a procedure base address from which locations in the procedure currently being executed are calculated, a frame address from which locations in the stack frame corresponding to the current execution are calculated, and a static data address from which locations in a static data area associated with a set of procedure executions performed by a single process are calculated. The static data area address and the procedure base address are derived from information in a procedure environment descriptor associated with each procedure The frame address changes each time a call or return instruction is executed; the procedure base address and the static data area address may change only when a call or return commences or resumes execution of a procedure having a procedure environment descriptor different from that of the procedure containing the call instruction or the return instruction.

Other aspects of the present invention include the specification of base addresses in name table entries in the following fashions:

- By means of an architectural base address specifier specifying one of the architectural base addresses.
- By means of an architectural base address specifier and a pointer location specifier specifying the displacement of a pointer from the specified architectural base address. The pointer is then the base address.
- By means of an included name which is resolved to obtain the base address.
- By means of an included name which is evaluated to obtain a pointer which is the base address.

Displacements, too, may be specified by means of included names. These included names are evaluated to obtain the displacement. In name table entries for array elements, finally, the displacement is calculated by multiplying an index value by an inter-element displacement value. In the present invention, either or both may be names.

It is thus an object of the present invention to provide an improved data processing system.

It is another object of the present invention to provide a data processing system capable of use in large, interconnected data processing networks.

It is yet another object of the present invention to provide an improved addressing mechanism suitable for use in large, interconnected data processing networks.

It is a further object of the present invention to provide an improved information protection mechanism.

It is still another object of the present invention to provide a simplified and flexible user interface to a data processing system.

It is yet a further object of the present invention to provide an improved mechanism for referring to operands.

It is a still further object of the present invention to provide an instruction structure allowing efficient data processing system operation with a plurality of high level user languages.

It is a further object of the present invention to provide data processing internal mechanisms protected from user interference.

It is yet another object of the present invention to provide a data processing system having a flexible internal structure capable of multiple, concurrent operations.

Other objects, advantages and features of the present invention will be understood by those of ordinary skill in the art, after referring to the following detailed description of the preferred embodiments and drawings wherein:

BRIEF DESCRIPTION OF DRAWINGS

FIG. 1 is a partial block diagram of a computer system incorporating the present invention;

FIG. 274 is a diagram illustrating fetch unit micromachine programs;

FIGS. 275-300 are not used.

FIG. 301 is a diagram illustrating pointer formats;

FIG. 304 is a diagram illustrating name table entries;

This application incorporates by reference the entire U.S. Pat. No. 4,455,602, issued on June 19, 1984, of Ward Baxter II et al, which issued from application Ser. No. 266,402, filed on same date and with common specification and drawings as the present application.

Figure 302:
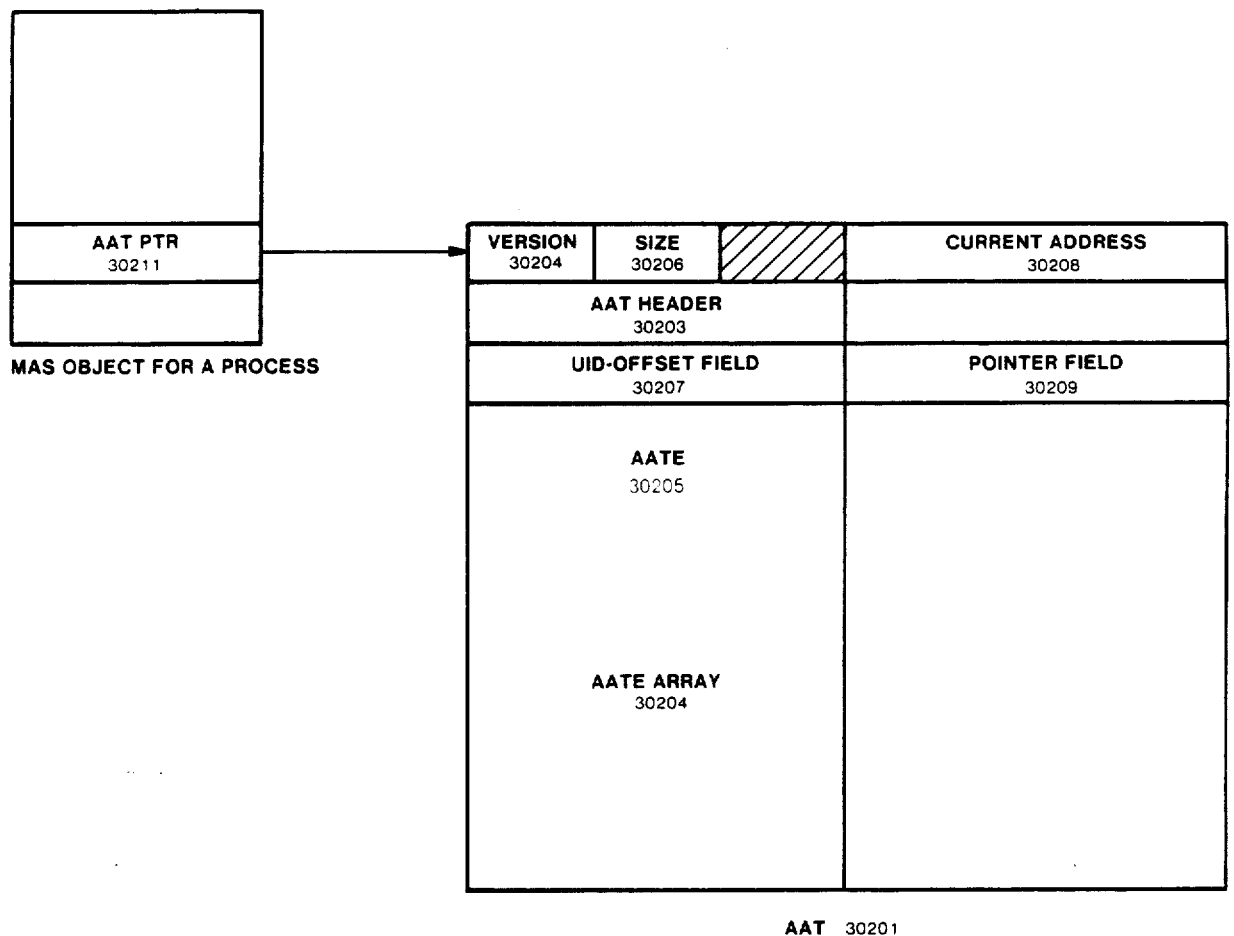
FIG. 302 is a diagram illustrating an associated address table.
Figure 303:
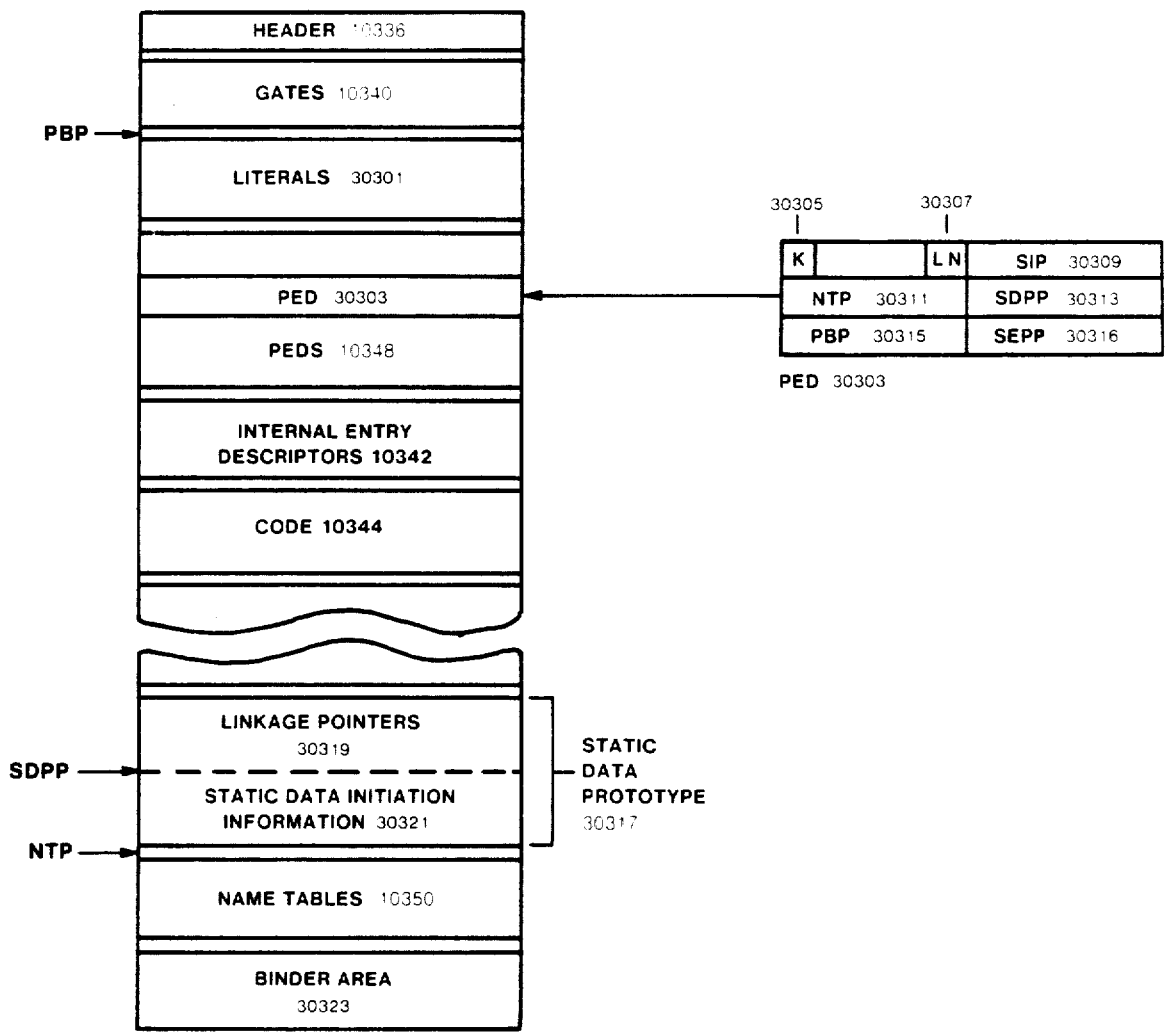
FIG. 303 is a diagram illustrating a namespace overview of a procedure object.
Figure 305:
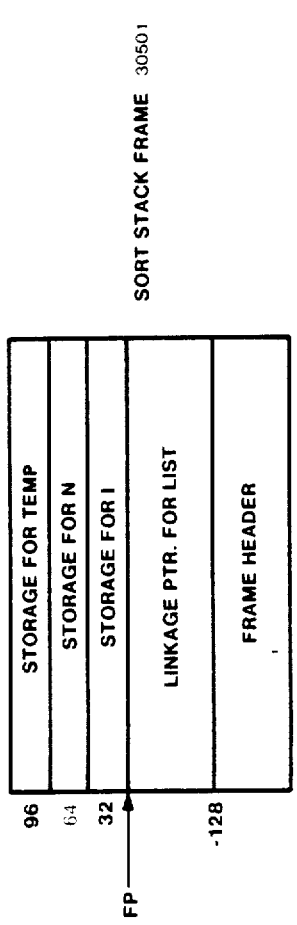
FIG. 305 is a diagram illustrating an example of name resolution.
Figure 306:
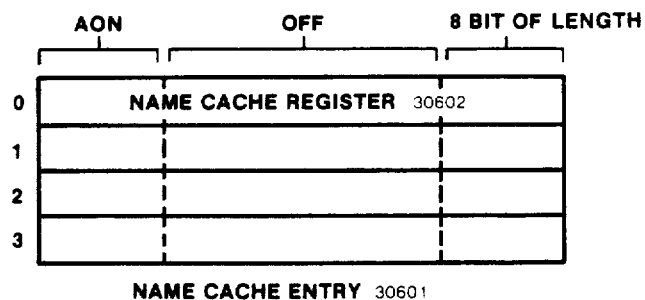
FIG. 306 is a diagram illustrating name cache entries.
Figure 307:
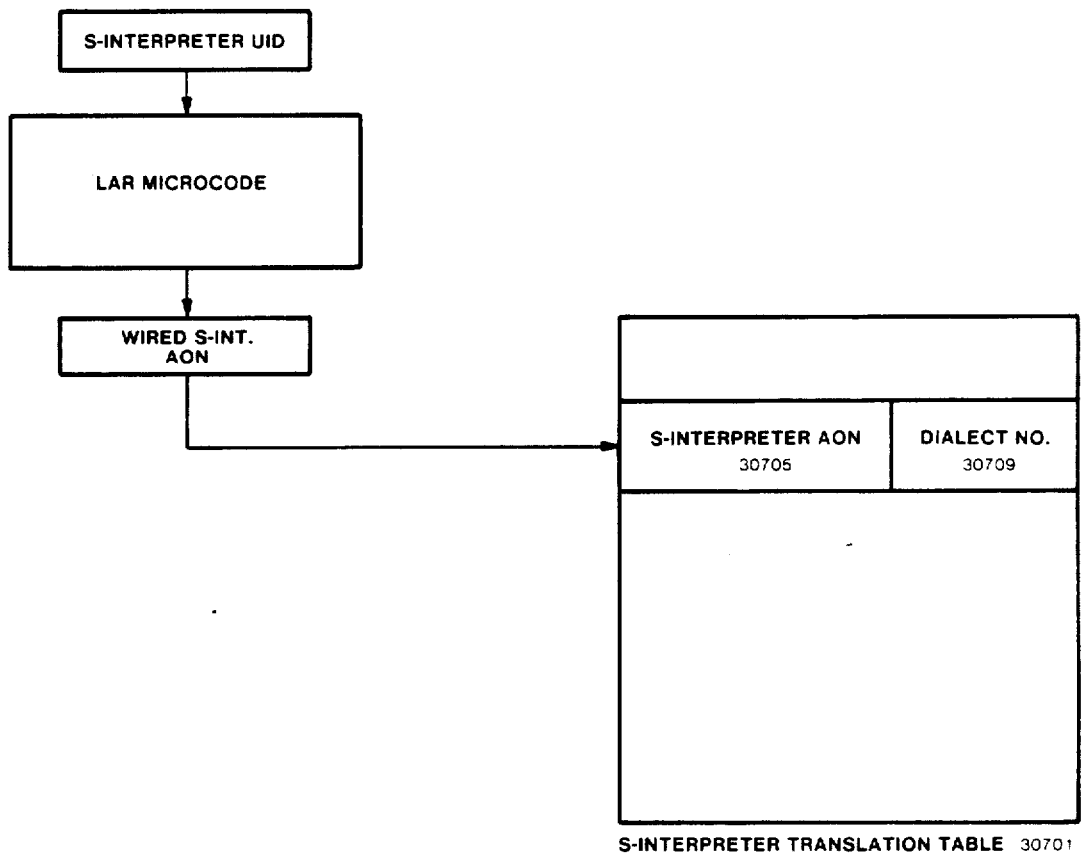
FIG. 307 is a diagram illustrating translation of S-interpreter universal identifiers to dialect numbers.

More particularly, attention is directed to FIGS. 274 through 307 of the drawings in U.S. Pat. No. 4,455,602, and to that part of the specification, particularly at columns 327 through 349 thereof, which relate to subject matter of the claims herein.

We claim:

1. A digital computer system comprising
memory means for storing and providing data items, said memory means including
means for organizing said memory means into objects in which said data items are located in said memory means, each of said objects being identified by an object identifier and access to said data items being limited to a set of subjects which identify entities for which said digital computer system may access said data items and being further limited for each subject of said set of subjects to a set of memory operations, and
memory operation means responsive to memory operation specifiers for determining whether a subject can perform an operation specified by a memory operation specifier, said memory operation specifier including
a logical address specifying an object identifier and a location in an object identified thereby, and
a memory command specifying a memory operation, and
a representation of a current subject for which said digital computer system is currently accessing one of said data items specified by said logical address for performing the memory operation specified by said memory command on the data item specified by said logical address when said current subject is one of the set of subjects having access to the object specified by said logical address and when said memory command specifies one of said memory operations which said current subject may perform on the data items belonging to the object specified by said logical address, and wherein said data items include instructions comprising
operation codes specifying operations of said digital computer system, certain instructions each further including
a name representing a data item to be used in the operation specified by said operation code, and
a plurality of name table entries of data items in said memory means, each of said name table entries corresponding to a name value and containing
a base specifier for deriving a base address from an architectural base address of a set thereof for the addresses associated with a current instruction of said certain instructions, and
a displacement specifier for deriving a displacement value specifying a displacement from said base address, and
processor means connected to said memory means for processing said data items and providing said memory operation specifier and a representation of said current subject to said memory means in response to said instructions, said processor means including
instruction decoding means for decoding the operation code in a current instruction of said instructions,
logical address generation means for providing said logical addresses and including
name interpretation means responsive to a name for deriving a descriptor for a name table entry corresponding to said name using said name value, for using said descriptor to fetch said name table entry from said memory means, and for using said corresponding name table entry to
derive a base address using the architectural base addresses as specified by said base specifier and
derive a displacement as specified by said displacement specifier
and thereupon to
add said displacement to said base address to produce a resolved address of said represented data item and
produce said resolved descriptor using said resolved address and
next instruction address generation means for providing the logical address of a next current instruction, and control means responsive to said operation code decoding means and said logical address generation means for controlling the operation of said processor means and providing the representation of said current subject and said memory operation specifier including the logical address provided by said logical address generation means to said memory means.

2. A digital computer system of claim 1 wherein said object identifiers all differ from each other and each object is uniquely identifed by the object identifier associated with said object.

3. A digital computer system of claim 1 wherein said processor means includes a first plurality of processor means,
   said memory means includes global memory means, and
   said memory means includes a first plurality of local memory means connected between said global memory means and said first plurality of processor means.

4. A digital computer system of claim 1 wherein the offset in said logical address may specify any bit in the object specified by said object identifier.

5. A digital computer system of claim 1 wherein each instruction code in said instructions belongs to one set of a plurality of sets of instruction codes;
   all said instruction codes in a single procedure item belong to the same instruction code set, said procedure item having associated with it an instruction code set identifier specifying said instruction code set;
   said processor means further includes private memory means accessible only to said processor means and containing a dialect value representing the instruction code set identifier for the procedure currently being executed; and
   said instruction decoding means and said control means are responsive to all of said operation code sets and respond to the instruction currently being executed as determined by the operation code in said instruction and the value representing said instruction code set identifier.

6. A digital computer system of claim 5 wherein
   each of said operation code sets includes a call operation code specifying a call operation for suspending the execution of the procedure currently being executed by said processor means, locating another procedure setting said dialect value to specify the operation code set for said located procedure, and beginning a new execution of said located procedure;
   each of said operation code sets includes a return operation code specifying a return operation for terminating the execution of the procedure currently being executed, locating the procedure whose execution was suspended to commence said current execution, setting said dialect value to specify the operation code set for the procedure whose execution is being resumed, and resuming said suspended execution; and
   said processor means sets said dialect value only in response to said call operation code and said return operation code.

7. A digital computer system of claim 5 wherein all said operation codes have the same size and all the names in one procedure item have the same size.

8. A digital computer system of claim 3 wherein said memory organizing means includes a logical allocation directory and a plurality of logical allocation directory entry items for defining said objects, each of said logical allocation unit directory entry items containing a size attribute specifying the current size of a defined object;
   said logical address generation means provides a logical descriptor containing a logical address and a length specifier to said local memory means;
   said name table entry item corresponding to said name further specifies how the length of the data item represented by said name is to be derived;
   said name resolution means further derives the length specifier as specified by said name table entry corresponding to said name;
   said memory operation specifier further includes said logical descriptor and said local memory means responds to said logical descriptor by providing the data item at the location specified by the representation of said object identifier and said offset and having the length specified by said length specifier; and
   said memory operation means includes access checking means and an access control table, said accessing checking means providing a copy of said size attribute in said access control table and for inhibiting said local memory means from performing the memory operation specified by said memory operation specifier when the data item specified by said logical address and said length specifier extends beyond the end of said object as specified by said size attribute.

9. A digital computer system of claim 8 wherein said size attribute specifies a size which may be any number of bits up to the maximum size of said object; and
   said length specifier may specify any number of bits.

10. A digital computer system of claim 1 wherein said data items include pointer items whose value includes said object identifier and said offset; and
    said logical address generation means further includes pointer to logical address conversion means for converting the pointer item received from said local memory means to a logical address containing the representation of the object identifier and the offset contained in said pointer item and
    logical address to pointer conversion means for converting said logical address to a pointer item containing the object identifier corresponding to the representation in said logical address and the offset in said logical address and providing said pointer item to said local memory means, whereby said processor means may obtain the logical addresses of said data items from said pointer items and may form said pointer items from the logical addrresses of said data items.

11. A digital computer system of claim 10 wherein the offset in said logical address may specify any bit in the object specified by the representation of said object identifier and the offset in said pointer item may specify any bit in the object specified by the object identifier in said pointer item.

12. A digital computer system of claim 8 wherein said logical allocation unit directory entry for said procedure object includes a domain of execution attribute;
    said current subject includes said domain of execution attribute for the procedure object containing the procedure currently being executed by said processor means;

said instructions include
- a call instruction specifying a call operation for suspending the execution of the procedure currently being executed by said processor means, locating another procedure, if the located procedure is in another procedure object, setting the representation of said current subject to represent the subject containing the domain of execution attribute for said another procedure object, and beginning a new execution of said located procedure and
- a return instruction specifying a return operation for terminating the execution of the procedure currently being executed, locating the procedure whose execution was suspended to commence said current execution, if said located procedure is in a different said procedure object, setting the representation of said current subject to represent the subject containing the domain of execution attribute for said different procedure object, and resuming said suspended execution; and
- said processor means sets the representation of said current subject only in response to said call instruction and said return instruction.

13. A digital computer system of claim 1 wherein said data items further include pointers, each of said pointers representing an address and including linkage pointers located at negative displacements from a selected architectural base address, the base specifier in first selected name table entries specifying one said linkage pointer as said base address; and
- said name interpretation means responds to received names corresponding to said selected name table entries by
  - (a) using said base specifier to derive a descriptor for said one linkage pointer,
  - (b) using said linkage pointer descriptor to derive a selected memory signal,
  - (c) receiving the linkage pointer provided by said memory means in response to said selected memory signal, and
  - (d) using the address represented by said linkage pointer as said base address.

14. A digital computer system of claim 13 wherein said base specificier in said selected name table entries includes
- (a) an architectural base address specifier specifying one of a set of architectural base addresses and
- (b) a linkage pointer displacement value specifying said negative displacement of said linkage pointer from said specified architectural base address; and
- said name interpretation means derives said linkage pointer descriptor by adding said negative displacement contained in said base specifier to said specifed architectural base address.

15. A digital computer system of claim 1 wherein said set of architectural base addresses associated with said current execution consists of three said addresses.

16. A digital computer system of claim 1 wherein said data items further include a plurality of process items, each of said process items containing data items associated with selected executions of said procedures, each one of said process items including
- at least one frame of said data items, each of said frames corresponding to one execution of said selected executions, and
- a static data area of said data items; and
- said set of architectural base addresses associated with said current execution includes
  - (a) a frame address to which said displacement values are added to specify locations in the frame corresponding to said current execution,
  - (b) a static data address to which said displacement values are added to specify locations in said static data area associated with said current execution, and
  - (c) a procedure base address to which said displacement values are added to specify locations in said procedure the instructions of which are being executed in said current execution.

17. A digital computer system of claim 16 wherein said processor means performs a call operation for suspending a current execution of a procedure, locating another procedure, and beginning the execution of said located procedure and a return operation for terminating the execution of said located procedure, locating the procedure whose execution was suspended, and resuming the execution of said suspended procedure, said processor means further include means responsive to said call and said return operation for obtaining a set of architectural base addresses associated with the execution commenced by said call operation or resumed by said return operation, wherein said further means
- (a) saves said set of architectural base addresses associated with the current execution in the frame associated with said current execution before obtaining said set of architectural base addresses associated with the execution commenced by said call operation and
- (b) obtains said saved set of architectural base addresses for the execution resumed by said return operation from the frame associated with said resumed current execution.

18. A digital computer system of claim 17 wherein said data items further include a plurality of procedure environment descriptors, each of said procedure environment descriptors being associated with at least one procedure and containing
- a procedure base address specifier from which the procedure base address for any procedure associated with said procedure environment descriptor and
- a static data address specifier from which the static data address for the execution of any said associated procedure may be derived; and
- said further means derives said procedure base address from said procedure base specifier and said static data address from said static data address specifier when the procedure whose execution is commenced by said call operation has a different procedure environment descriptor from the procedure whose execution is suspended by said call operation and leaves said procedure base address and said static data address unchanged when the procedure whose execution is commenced by said call operation has the same procedure environment descriptor as the procedure whose execution is suspended by said call operation.

* * * * *